United States Patent [19]

Freeman

[11] 3,753,081

[45] Aug. 14, 1973

[54] GYROMAGNETIC RESONANCE METHOD AND APPARATUS FOR OBTAINING SPIN-SPIN COUPLING CONSTANTS

[75] Inventor: Raymond Freeman, Menlo Park, Calif.

[73] Assignee: Varian Associates, Palo Alto, Calif.

[22] Filed: Dec. 30, 1971

[21] Appl. No.: 214,137

[52] U.S. Cl............................................... 324/0.5 R
[51] Int. Cl. ............................................ G01n 27/78
[58] Field of Search...................... 324/0.5 R, 0.5 A, 324/0.5 AC

[56] References Cited
OTHER PUBLICATIONS

R. Freeman and H. D. W. Hill–High Resolution Studies of NMR Spin Echoes: "J. Spectra" Journal of Chem. Physics 54(1) Jan. 1, 1971 pp. 301–313

*Primary Examiner*—Michael J. Lynch
*Attorney*—Harry E. Aine and Gerald M. Fisher

[57] ABSTRACT

Spin-spin coupling constants are obtained by exciting and detecting a decaying train of time displaced spin echo resonances of a plurality of spin-spin coupled groups of gyromagnetic resonators, such as a group of chemically shifted homonuclear atomic nuclei, within a sample under analysis. The envelope of the peak amplitude of the train of spin echo resonances decays and is modulated in accordance with the spin-spin coupling constants. The modulated envelope is Fourier analyzed to separate the individual Fourier frequency components, each component corresponding to one-half the sums and differences of the different spin-spin coupling constants, whereby a spectrum of spin-spin coupling constants is obtained which is free of magnetic field inhomogeneity effects and chemical shifts.

12 Claims, 7 Drawing Figures

ECHOES
TIME →
60 SEC

J SPECTRUM (AMX)

J SPECTRUM (A)
1/2(J_AM − J_AX)   1/2(J_AM + J_AX)

J SPECTRUM (M)
1/2(J_AM − J_MX)   1/2(J_AM + J_MX)

J SPECTRUM (X)
1/2(J_AX − J_MX)   1/2(J_AX + J_MX)

FREQUENCY (Hz) →

GYROMAGNETIC RESONANCE METHOD AND APPARATUS FOR OBTAINING SPIN-SPIN COUPLING CONSTANTS

DESCRIPTION OF THE PRIOR ART

Heretofore, it has been observed that the decaying envelope of the peak amplitude of a train of spin echo pulses contains a modulation component of a frequency corresponding to one-half of the spin-spin coupling constant between two spin-spin coupled chemically shifted homonuclear groups of nuclei within the sample. Such an observation was made by E.L. Hahn and D.E. Maxwell in the physical Review, Vol. 88, page 1070, (1952); and by J.G. Powles and A. Hartland in the Proceedings of the Physical Society of London, Vol. 77, page 273, (1961).

These prior observations were made for a relatively simple molecule, namely, one in which spin-spin coupling was present between only two groups of gyromagnetic resonators. In such a case, there is only one spin-spin coupling constant leading to only one frequency of modulation on the decaying envelope of the peak amplitude of the train of successive spin echoes. This modulation component was readily abstracted from a recording of the modulated envelope by merely measuring the period of the modulation to derive the frequency of the coupling, thereby yielding a measure of the coupling constant in terms of frequency. Such coupling constants are typically in the range from 0 to several Hz for homonuclear spin-spin coupling constants.

While the teachings of the prior art demonstrated that the spin-spin coupling constant between two spin-spin coupled groups of gyromagnetic bodies could be extracted from the modulated envelope of the peak amplitudes of the decaying sequence of spin echoes, there was no teaching or suggestion of how to extract the coupling constants from such a modulated envelope when more than one spin-spin coupling constant was involved. More particularly, when there is spin-spin coupling between more than two groups of gyromagnetic bodies, the number of spin-spin coupling constants are multiplicative rather than additive and sums and differences of spin-spin coupling constants are observed. For N number of different spins N (N−1)/2 coupling constants are involved and the envelope modulation contains $N \times 2^{N-2}$ Fourier components. Moreover, each Fourier frequency component of the modulation decays at a different rate while the unmodulated spin echo envelope is decaying at a different rate.

Thus, where a plurality of spin-spin coupling constants are involved, it is extermely difficult if not impossible to apply the prior art method of visually observing the period of a particular modulation component in the envelope and deriving from the observed period its frequency and thus the coupling constant.

It is important to ascertain the spin-spin coupling constants in order to facilitate and simplify analysis of complex gyromagnetic resonance spectra. For example, in the gyromagnetic resonance spectrum of a complex molecule, nuclear resonance lines may be broadened due to magnetic field inhomogeneities and lines split by spin-spin coupling and shifted due to chemical shifts within the spectrum. In such cases, analysis of the resultant spectra can be substantially simplified by determining the spin-spin coupling constants and assigning the determined spin-spin line splittings in the complex spectra to simplify identification of the conventionally obtained spectrum which includes chemical shift effects.

SUMMARY OF THE PRESENT INVENTION

The principal object of the present invention is the provision of improved gyromagnetic resonance method and apparatus for obtaining spin-spin coupling constants.

In one feature of the present invention, the decaying envelope of peak spin echo amplitude, which is modulated in accordance with plurality of spin-spin coupling constants between at least three spin-spin coupled groups of gyromagnetic resonators, is frequency analyzed to separate at least one of the Fourier modulation components therefrom, whereby spin-spin coupling constant gyromagnetic resonance data is obtained which is substantially free of magnetic field inhomogeneity effects.

In another feature of the present invention, at least one of a plurality of spin-spin coupled groups of gyromagnetic resonators is decoupled from the other spins in an excited train of spin echo resonances by exciting forced continuous resonant precession of the group to be decoupled, whereby the group which is excited into forced precession is spin-spin decoupled from the remaining spin-spin coupled groups to substantially simplify the modulation of the decaying envelope of peak amplitude of the train of spin echoes.

In another feature of the present invention, the modulation of the decaying envelope of a train of spin echoes is substantially simplified by selectively detecting spin echo resonance within a band of resonant frequencies which excludes the resonance frequency of at least one of the excited groups of spin-spin coupled resonators, whereby at least one spin-spin coupling constant is eliminated from the spin-spin coupling modulation of said spin echo envelope.

In another feature of the present invention, the decaying envelope of the peak spin echo amplitude for a train of spin echo resonances is frequency analyzed by Fourier transforming the modulation of the envelope from the time domain to the frequency domain to obtain the separate frequency components of the modulation and thus the separate spin-spin coupling constants.

Other features and advantages of the present invention will become apparent upon a perusal of the following specification taken in connection with the accompanying drawings wherein:

DESCRIPTION OF THE PREFERRED EMBODIMENTS

Figure 1:
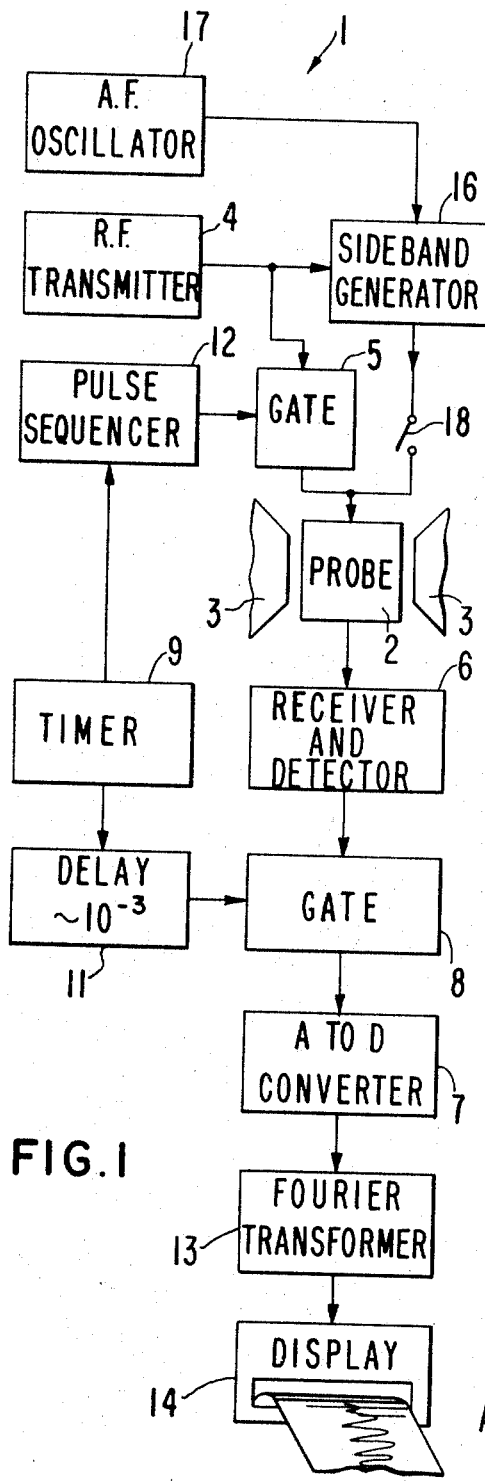
FIG. 1 is a schematic block diagram of a gyromagnetic resonance spectrometer incorporating features of the present invention.

Referring now to FIG. 1 there is shown a gyromagnetic resonance spin echo spectrometer 1 incorporating features of the present invention. The spectrometer 1 includes a probe 2 for containing a sample of matter to be investigated which is inserted within an intense uniform polarizing magnetic field produced between poles 3 of a powerful electromagnet or permanent magnet. In a typical example, the magnetic field between the poles 3 is between 10,000 and 50,000 gauss.

The probe 2 contains a radio frequency transmitter coil, not shown, for applying a radio frequency magnetic field to the sample at an angle to the polarizing magnetic field for exciting gyromagnetic resonance of the gyromagnetic resonators within the sample. The radio frequency energy is supplied to the transmitter coil from a radio frequency transmitter 4 via the intermediary of a gate 5 for pulsing of radio frequency energy to the probe 2 in accordance with a desired pulse sequence, such as the sequence shown in the upper trace of FIG. 2.

The probe 2 also contains a receiver coil, not shown, which is oriented orthogonally to the transmitter coil for picking up radio frequency resonance signals emanating from the sample within the probe. The resonance signals picked up by the receiver coils are fed to the input of a receiver and detector 6 wherein they are amplified and detected and thence fed to the input of an analog to digital convertor 7 via the intermediary of a sampling gate 8.

Figure 2:
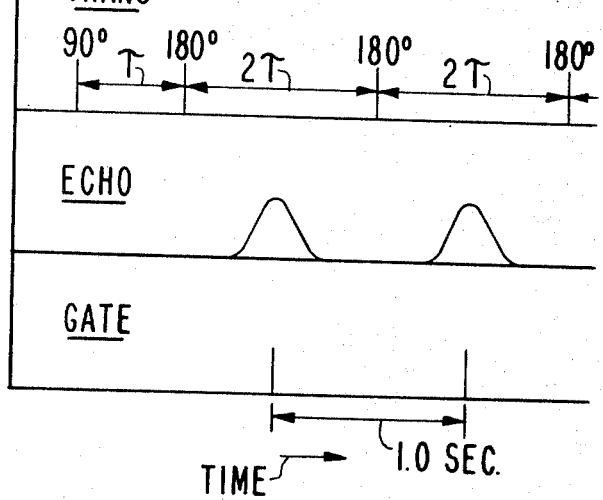
FIG. 2 is a composite timing diagram depicting the operating cycles for the RF transmitter, spin echoes as received in the receiver and detector, and sampling gate, respectively, for the spectrometer of FIG. 1.

The sequence of transmitter pulses supplied to the probe 2 via the gate 5 and depicted in the upper trace of FIG. 2 are sequenced and proportioned in amplitude and duration to excite a train of spin echo resonances of the gyromagnetic resonators within the sample under analysis. A particularly suitable pulse sequence is that as taught by H.Y. Carr et al. in Physical Review, Vol. 94, page 630, (1954). More particularly, this sequence consists of radio frequency pulses, the frequency of which are chosen to be tuned to the Larmor or gyromagnetic resonance frequency of the particular resonators to be excited into resonance, such as protons which are the nuclei of hydrogen atoms in a liquid molecular sample material under analysis such as 3-bromothiophene-2-aldehyde.

The first pulse of the sequence, identified as 90°, has an amplitude and duration to tip the spins of the gyromagnetic bodies by approximately 90° from the direction of the polarizing magnetic field between the poles 3. The magnitude of the radio frequency magnetic field is selected to excite uniformly all the various chemically shifted groups of gyromagnetic bodies, such as protons, within the sample under analysis.

In a typical example of a proton magnetic resonance, the chemical shift spectrum may extend for a bandwidth of approximately 1,000 Hz. In such a case, the radio frequency magnetic field should have sufficient intensity to provide substantially constant resonance excitation over the expected bandwidth of the spectrum. Thus, in a typical example, the bandwidth between half power points of the RF exciting field should be approximately 10 KHz which would require the radio frequency magnetic field to have an intensity of approximately 2.5 gauss within the sample.

The duration of the first (90°) radio frequency pulse applied to the sample is selected such that the gyromagnetic resonators will be tipped or precessed to an orientation approximately 90° to the direction of the polarizing magnetic field. The transmitter pulse is then abruptly terminated and the gyromagnetic resonators are allowed to freely precess about the direction of the polarizing field.

During their precession, the gyromagnetic resonators lose phase coherence due to a number of different effects including magnetic shielding due to the presence of the electrons around the nucleus of the hydrogen atoms and their particular site in the molecule, due to the inhomogeneity in the magnetic field, and due to spin-spin coupling constants between the hydrogen nuclei or gyromagnetic resonators disposed in different sites in the molecule.

After some predetermined interval of time $\tau$, which may be rather arbitrarily selected and which may comprise for example 0.5 second but such time should be selected to satisfy the following relation; $\tau >> 1/2 \pi |\delta|$ where $\tau$ is the time between the end of the 90° pulse and the beginning of the next or refocusing pulse identified 180° and $\delta$ is the smallest chemical shift frequency in the spectrum under analysis.

Thus, after the inverval $\tau$, a second radio frequency pulse (180°) is gated by gate 5 to the probe 2 which is substantially identical to the first 90° pulse but which is twice the duration of the first pulse to cause the precessing magnetic moments or resonators to reverse their direction of precession. Such a pulse is called a refocusing pulse because it causes the phase differences in the precessing bodies to be refocused to a phase coincidence or reinforcement at a period $\tau$ after the end of the refocusing pulse.

Such a reinforced pulse is called a spin echo and is shown by the second signal trace in FIG. 2, and identified as ECHO. The positive half of the envelope of the spin echo is shown on the echo trace but it is to be understood that the echo signal is precessing at substantially the Larmor or gyromagnetic resonance frequency at or near the radio frequency of transmitter 4.

Thus, after a period $\tau$ following the peak of the spin echo signal, a second (180°) refocusing pulse is applied to the sample to cause the precessing magnetic moments to flip by another 180° and refocus at a time $2\tau$ following the peak of the first echo signal.

The train radio frequency transmitter pulses applied to the sample has the sequence 90°–$\tau$–180°–2$\tau$–180°–2$\tau$–180° . . . . The spin echoes have a sequence with a peak amplitude occurring at $n(2\tau)$ following termination of the first transmitter pulse, where n can have any integer value. However, it will be noted that the peak amplitude of each successive echo signal has a reduced amplitude in accordance with a decay; with the time constant $T_2$ of the decay being the transverse relaxation time for the particular gyromagnetic resonator being examined. Thus, in a time of approximately $2T_2$ the amplitude of the spin echoes decays into the noise level and the sequence is terminated.

The sampling gate 8 is timed by means of a timer 9 and delay 11 such as to sample the peak amplitude of the envelope of the successive echoes in accordance with the sampling sequence identified as GATE in FIG. 2. The timer 9, in a typical example, comprises the timer portion of a dedicated general purpose digital computer such as a Varian Data Machine model 620i digital computer commercially available from Varian Associates of Palo Alto, Calif.

The timer 9 also serves to actuate a pulse sequencer 12 for deriving the sequence of transmitter pulses as indicated above with regard to the transmitter sequence of FIG. 2. The output of the pulse sequencer 12 is fed to control gate 5 for gating the transmitter pulses to the probe 2. The timer 9, which also synchronizes the sampling gate 8, causes the sampling gate 8 to sample the received spin echo envelope in accordance with the peak amplitude of each of the spin echo envelopes, namely, at a point $\tau$ after termination of each of the 180° refocusing pulses. Due to delays in the receiver and detector 6, delay 11 causes opening of the sampling gate 8 to be delayed by approximately 1 millisecond relative to $\tau$ after the refocusing pulses to compensate for the delays in the receiver and detector 6.

The output of the sampling gate 8 is fed to an analog-to-digital converter 7 wherein the sampled peak amplitude of the successive echoes is converted into a digital input which is fed to the input of a Fourier transformer 13. The Fourier transformer 13 may comprise any one of a number of different devices.

In a preferred embodiment, the Fourier transformer 13 includes the memory of a 620i digital computer and the sampled output from the gate 8 is fed and stored in successive channels of the memory of the computer. In a typical example, there may be as many as 150 or more pulse echoes generated by one initial 90° transmitter pulse such echoes being successively refocused by the sequence of 180° refocusing pulses until such time as the echo amplitude decays into the noise.

The successively sampled amplitudes of the echoes are stored in successive channels of the Fourier transformer 13 and upon completion of the sampling sequence, i.e., upon the echoes decaying into the noise level, the transformer 13 performs a Fourier transformation on the stored digital information to produce and separate the individual Fourier components of the sampled spin echo envelope. The Fourier components are separated and displayed on a display 14 such as an X-Y recorder where the amplitude of the individual Fourier components are plotted as a function of frequency.

The Fourier transformer 13 may comprise, for example, a Fourier transform computer for Fourier transforming the envelope of the spin echo resonances. Such a Fourier transform computer is disclosed and claimed in U.S. Pat. No. 3,475,680 issued 28 Oct. 1969. As an alternative, an analog Fourier transformer may be employed which records the modulated spin echo envelope of the spin echo resonances in an optical recorder such as on a photographic film which is then processed and passed through an optical spectrograph as an optical diffraction grating which is analyzed by a photoelectric densitometer to produce the separate Fourier components. As an alternative, the spin echo envelope signal is recorded on a magnetic tape and repetitively played back and heterodyned with the frequency of a variable frequency oscillator. The beat difference frequencies are fed through a narrow band filter and detected to separate the Fourier components. Such Fourier analyzers are disclosed and claimed in U.S. Pat. No. 3,287,629 issued Nov. 22, 1966.

The preferred Fourier transformer embodiment of the present invention utilizes a programmed Fourier transform digital computer such as the 620i as disclosed in U.S. Pat. No. 3,475,680. The computer is programmed in accordance with the table of algorithm provided in an article titled "The Fast Fourier Transform Algorithm" of J.W. Cooley and J.W. Tukey, appearing in Mathematical Computations, Vol. 19, page 297, (1965) and modified to include the modifications suggested by G.D. Bergland in the Communications of the Association for Computing Machinery, Vol. 11, page 703, (1968).

Figure 3:
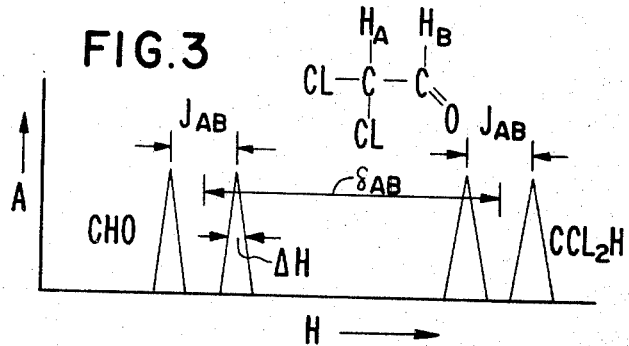
FIG. 3 is a simplified nuclear resonance spectrum for the chemically shifted and spin-spin coupled protons of the molecule depicted in FIG. 3.

Referring now to FIG. 3, there is shown a typical nuclear magnetic resonance spectrum for the protons of the molecule depicted in FIG. 3 and obtained, for example, by scanning through the resonance spectrum with a swept polarizing magnetic field in a conventional gyromagnetic resonance spectrometer, not shown. In such a molecule, the protons are divided into two different groups, namely, group $H_A$ and $H_B$. These two groups of protons are chemically shifted and spin-spin coupled. The spectrum for the protons is as shown in FIG. 3 and comprises two chemically shifted lines, shifted by frequency or magnetic field H equivalent to $\delta_{AB}$. In addition, each of the chemically shifted lines is split due to the spin-spin coupling constant $J_{AB}$ between the group of $H_A$ protons and group of $H_B$ protons and the width of each of the chemically shifted lines is proportional to the gradients of the polarizing magnetic field $\Delta H$.

Figure 4:
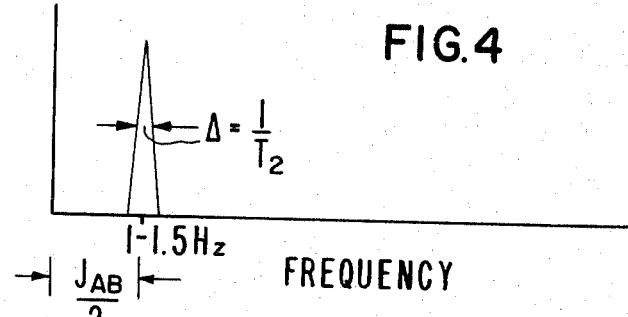
FIG. 4 is a spectrum depicting the spin-spin coupling constant for the molecule of FIG. 3.

In a molecule having only two spin-spin coupled groups of chemically shifted nuclei there is only one spin-spin coupling constant. For the sample case of FIG. 3, the coupling constant $J_{AB}$ may be readily separated and identified by the spectrometer 1 of FIG. 1. It turns out that the decaying envelope of peak echo amplitude for the train of spin echoes is modulated by the spin coupling constnt $J_{AB}$. Fourier analysis of the modulation of the peak spin echo envelope separates the spin-spin coupling constant. More particularly the spin-spin coupling constant spectrum, hereinafter sometimes referred to as J spectrum, for the simple case of only two groups of spin-spin coupled resonators is as shown in FIG. 4 and has only one spectral component of a frequency, on an absolute scale, equal to ½ the frequency splitting due to the spin-spin coupling constant.

Figure 5:
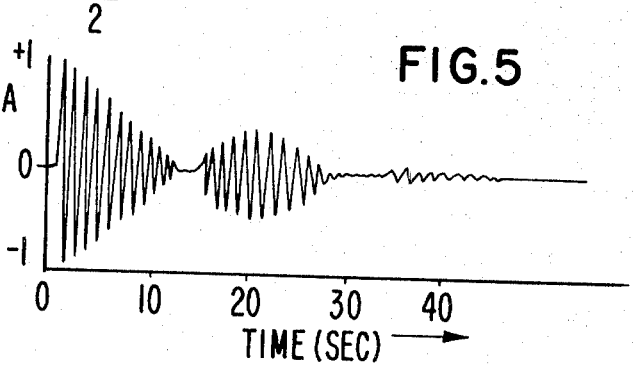
FIG. 5 is a plot of peak spin echo amplitude versus time depicting the modulation of the decaying envelope in the presence of at least two spin-spin coupling constants.

Referring now to FIG. 5, there is shown a typical envelope of peak spin echo amplitude as modulated by two widely different spin-spin coupling constants. In the particular trace of FIG. 5, it is obvious that there are at least two coupling constants one at a relatively low frequency and one at a relatively high frequency. However, as the molecule becomes more complicated and additional resonator groups become coupled due to spin-spin coupling constants, the modulation of the peak spin echo envelope becomes much more complex such as that shown in FIG. 6 for the molecule of FIG. 6.

Figures 6, 7:
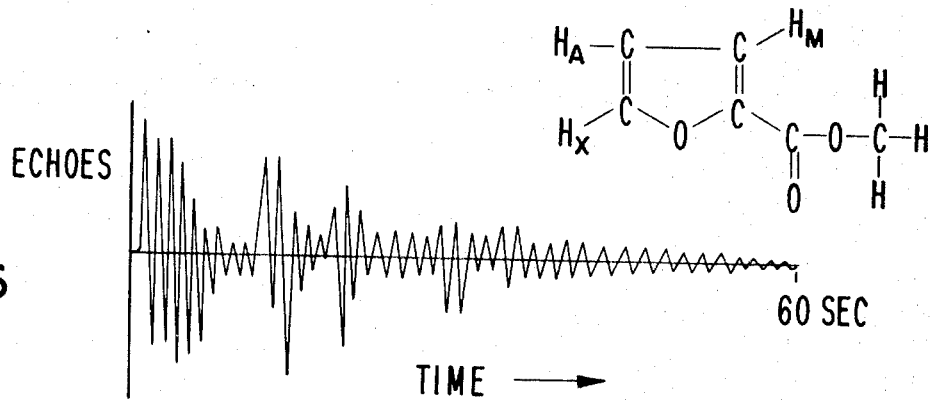
FIG. 6 is a plot of the envelope of spin echo peak amplitude for a train of decaying spin echoes, such envelope being modulated with a plurality of spin-spin coupling constants.
FIG. 7 is a plot of the spin coupling spectrum for the molecule of FIG. 6 depicting the composite spectrum for the spin-spin coupling constants of the A, M, and X protons, and for the partial spectra of the A, M, and X protons, respectively.

Referring now to FIG. 6, separation of the individual Fourier components of the modulation on the peak spin echo resonance envelope becomes much more difficult if not impossible without special Fourier analyzers, such as a Fourier transform computer 13 or an analog spectrum analyzer, as aforedescribed.

For example, referring now to FIG. 7, there is shown in the spectrum identified "J spectrum (AMX)," the spectrum of coupling constants for the molecule of FIG. 6 and depicting the spin-spin coupling spectrum for the proton groups $H_A$, $H_X$, and $H_M$. The J spectrum AMX is obtained at the output of the display 14 in the spectrometer of FIG. 1. This spectrum is relatively complex and it is moderately difficult to assign the individual lines of the spectrum to a particular coupling constant of the spin coupled A, X, and M groups. However, these coupling constants can be more easily ascertained by selective detection of resonance of each of the groups.

More particularly, in the spectrometer of FIG. 1, the receiver and detector 6 is tuned to detect excited resonance of the chemically shifted group $H_A$ to the exclusion of the resonances of the other groups. In such a case, the A group exhibits first order spin coupling to the two other groups of nuclei, namely, the $H_X$ and $H_M$ groups that are both subject to the influence of the RF pulses. The only points on the decaying train of spin echoes which are unaffected by chemical shift and field inhomogeneity effects are the spin echo peaks (at the times $2n\tau$), and it is at these points that the signal is sampled by the sampling gate 8. These echo signals are sampled at a frequency $F_s$ equal to $1/2\tau$ Hz. It follows from the sampling theorem that only frequency components below Fs/2 Hz are recoverable after the sampling process, higher frequency components being folded back into the range 0 to Fs Hz/2. Hz. These discrete points measured over a total period T seconds define a complex waveform, $$S = \cos(\pi J_{AM}\tau)\cos(\pi J_{AX}\tau)\exp(-\tau/T_2) \qquad 1$$

$$= \frac{1}{2}\{\cos[\pi(J_{AM}-J_{AX})\tau] + \cos[\pi(J_{AM}+J_{AX})\tau]\} \times \exp(-\tau/T_2).$$

As schematically indicated in FIG. 6, the discrete Fourier transform of this wave is readily calculated by a standard Fourier transform program in a conventional Fourier transform computer, as above described. The result of the Fourier transformation from the time domain to the frequency domain of the waveform of equation 1 is a spectrum extending from 0 to $F_s/2$ Hz with sampling points every 1/T Hz, containing two resonance responses at $(J_{AM} - J_{AX})/2$ and $(J_{AM} + J_{AX})/2$. Each line has a Lorentz shape with a full width $(T_2)^{-1}$ essentially uneffected by magnet inhomogeneity. Such a spectrum is shown by the J spectrum identified by trace (A) of FIG. 7 and is defined as a partial J spectrum due to selective detection of only the A group resonance.

The decomposition of the complex spectrum (AMX) into two modulation components and a spin-spin relaxation time is thus achieved in a very convenient fashion. Note that the spin-spin relaxation time $T_2$ is defined at the half amplitude points of the spectral line, as indicated in FIG. 4.

Note that the spin echo modulation due to spin-spin coupling to several different resonant nuclei is multiplicative rather than additive, just as in spin-spin splitting in conventional first order nuclear magnetic resonance spectra. This is the reason why sums and differences of spin coupling constants are observed in the J spectrum rather than the coupling constants themselves.

Thus, by tuning the receiver 6 to selectively detect the gyromagnetic resonance of each of the respective groups of nuclei, namely, $H_M$ and $H_X$, the partial J spectra (M) and (X), respectively, as shown in FIG. 7, are obtained. From these partial spectra, the individual spin-spin coupling constants are readily obtained by solution of the pairs of simultaneous equations represented by each set of spectra.

The partial J spectra, as shown in FIG. 7, are useful for determining and assigning the individual coupling constants to the complex J spectra. More particularly, the individual partial J spectra each define a set of simultaneously equations that may be readily solved for the individual spin coupling constants. For the particular example shown in FIG. 7, the solution of the simultaneous equations result in the following spin coupling constants:

$J_{AM} = \pm 3.47 \pm 0.19$ Hz
$J_{AX} = \pm 1.77 \pm 0.05$ Hz
$J_{MX} = \pm 0.87 \pm 0.06$ Hz

In addition to selective detection for obtaining partial J spectra, coupling constants may be deleted from complex J spectra by spin-spin decoupling. More specifically, an excited resonance group to be decoupled is selectively radiated with continuous radio frequency energy at its Larmor or gyromagnetic resonance frequency. In the spectrometer of FIG. 1, the group of gyromagnetic resonators to be decoupled, such as the $H_A$ group of protons, is radiated with radio frequency energy at its Larmor frequency by modulating a sample of the radio frequency transmitter signal in a sideband generator 16 with an audio frequency signal derived from an audio frequency oscillator 17, such that one of the generated sidebands is at the Larmor frequency of the group of gyromagnetic resonators to be decoupled. A switch 18 is closed to allow the selected sideband to be applied to the transmitter coil for applying the radio frequency energy to the group to be decoupled. If desired, additional audio frequency oscillators may be added and additional sidebands generated for decoupling one or more groups of gyromagnetic spin coupled gyromagnetic resonators for further simplifying the resultant partial J spectra.

Although the invention, thusfar described, has been specifically directed to determining the spin-spin coupling constants between homonuclear groups of resonators this is not a requirement as the method and apparatus may be employed for determining heteronuclear spin-spin coupling constants such as the coupling constant between fluorine and hydrogen in molecules containing both hydrogen and fluorine. In such a case, the radio frequency transmitter 4 will transmit radio frequency energy at both the Larmor frequency of the protons and the Larmor frequency of the fluorine atoms for simultaneously exciting spin echo resonances of both heteronuclear groups of resonators.

In a preferred embodiment of the spectrometer 1 of FIG. 1, the polarizing magnetic field is preferably stabilized by a conventional field-frequency control, not shown, which holds constant the ratio of the frequency of the resonance exciting radio frequency field to the intensity of the polarizing magnetic field. Typically the field-frequency control locks either the frequency of the transmitter 4 or the polarizing field intensity to a gyromagnetic resonance line within the sample or a control group of gyromagnetic resonators immersed in the same polarizing field as the sample under analysis.

What is claimed is:

1. In a method for obtaining spin-spin coupling gyromagnetic resonance data from a sample of matter immersed in a polarizing magnetic field the steps of, exciting and detecting a sequence of time displaced spin echo resonances of a plurality of spin-spin coupled groups of gyromagnetic resonators within the sample, said sequence of detected spin echo resonances having an envelope of echo peak amplitude which is modulated in accordance with a plurality of spin-spin coupling constants between at least three groups of spin-spin coupled gyromagnetic resonators, and analyzing said modulation of said envelope of spin echo peak amplitude to separate at least one of the Fourier components thereof, whereby spin-spin coupling constant gyromagnetic resonance spectral data is obtained which is substantially free of magnetic field inhomogeneity effects.

2. The method of claim 1 wherein the step of analyzing said modulation of said envelope of echo peak amplitude includes the step of, exciting forced precession of at least one of said spin-spin coupled groups of gyromagnetic resonators to decouple the spin of the forced precessional group of gyromagnetic resonators from at least two other groups of spin-spin coupled resonators to remove at least one of the Fourier components from said modulation of said envelope to simplify said analysis of said modulation of said envelope.

3. The method of claim 1 wherein the step of detecting said excited sequence of spin echo resonances includes the step of, selectively detecting said excited spin echo resonances within a band of gyromagnetic resonance frequencies which excludes at least the gyromagnetic resonance frequency of at least one of said excited groups of spin-spin coupled gyromagnetic resonators, whereby at least one spin-spin constant Fourier component is eliminated from said spin-spin coupling modulation of said envelope of spin echo amplitude.

4. The method of claim 1 wherein the step of analyzing said modulation of said envelope of spin echo peak amplitude includes the step of, Fourier transforming said modulation from the time domain to the frequency domain.

5. The method of claim 1 wherein said at least three groups of gyromagnetic resonators are separate chemically shifted groups of homonuclei.

6. In an apparatus for obtaining spin-spin coupling gyromagnetic resonance data from a sample of matter immersed in a polarizing magnetic field, means for exciting a sequence of time displaced spin echo resonances of a plurality of spin-spin coupled gyromagnetic resonators within said sample, means for detecting said sequence of excited spin echo resonances and for producing an output in accordance with the envelope of detected peak echo amplitude, such envelope being modulated in accordance with at least one spin-spin coupling constant between at least a plurality of said excited groups of spin-spin coupled gyromagnetic resonators, and means for analyzing said detected modulation of said envelope of spin echo peak amplitude to separate at least one of the Fourier components therefrom, whereby spin-spin coupling constant gyromagnetic resonance spectral data is obtained which is substantially free of magnetic field inhomogeneity effects.

7. The apparatus of claim 6 wherein said means for detecting said sequence of spin echoes and for producing an output in accordance with the envelope of detected peak echo amplitude includes, means for sampling the echo amplitude of said sequency of spin echos substantially only at the peak amplitude of each respective echo.

8. The apparatus of claim 6 wherein said sample includes at least three spin-spin coupled groups of gyromagnetic resonators to define at least three spin-spin coupling constants, and including means for exciting forced precession of at least one of said spin-spin coupled groups of gyromagnetic resonators during the sequence of spin echo resonance of at least the other two groups of resonators to decouple the spins of the forced precessional group of gyromagnetic resonators from at least the two other groups of spin-spin coupled resonators to remove at least one of the spin-spin coupling Fourier components from said modulation of said envelope to simplfy analysis of said modulation of said envelope.

9. The apparatus of claim 6 wherein said means for detecting said sequence of excited spin echo resonances includes, means for selectively detecting said excited spin echo resonances within a band of gyromagnetic resonance frequencies which excludes at least the gyromagnetic resonance frequency of at least one of said excited groups of spin-spin coupled gyromagnetic resonators, whereby at least one spin-spin coupling constant Fourier component is eliminated from said spin-spin coupling modulation of said envelope of peak echo amplitude.

10. The apparatus of claim 6 wherein said means for analyzing said detected modulation of said envelope of spin echo peak amplitude to separate at least one of the Fourier spin-spin coupling constant components therefrom includes, means for Fourier transforming said modulation from the time domain to the frequency domain.

11. The apparatus of claim 10 wherein said Fourier transforming means includes a programmed digital computer.

12. The apparatus of claim 6 wherein said spin-spin coupled groups of gyromagnetic resonators are separate chemically shifted homonuclear groups of atomic nuclei.

* * * * *